Aug. 3, 1937.　　　　J. G. SOLA　　　　2,088,617
ELECTRICAL HEATING MECHANISM FOR VEHICLES
Filed Oct. 23, 1934　　2 Sheets-Sheet 1
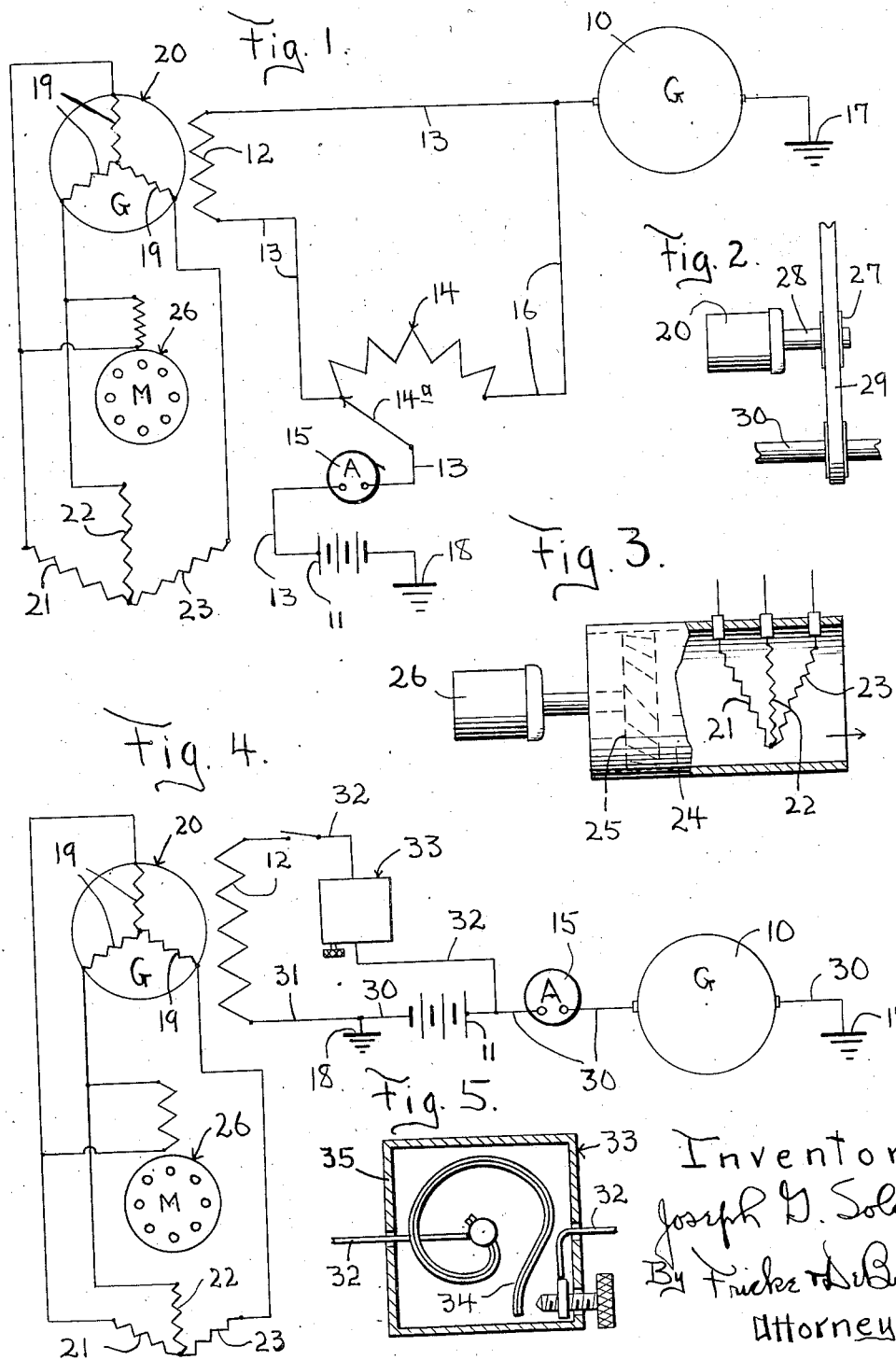

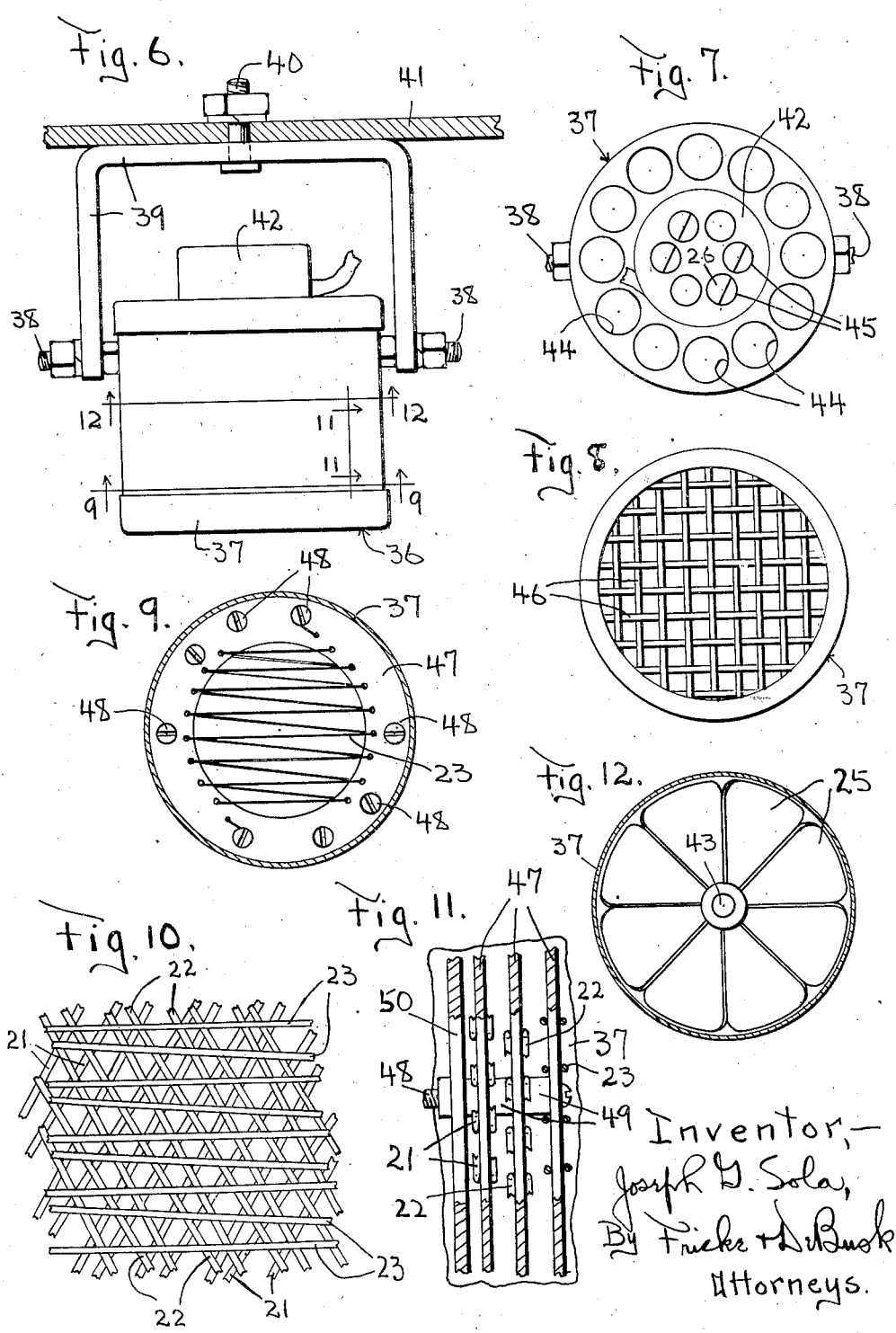

Patented Aug. 3, 1937

2,088,617

UNITED STATES PATENT OFFICE 2,088,617

ELECTRICAL HEATING MECHANISM FOR VEHICLES

Joseph G. Sola, Oak Park, Ill.

Application October 23, 1934, Serial No. 749,570

2 Claims. (Cl. 219—39)

My invention relates to electrical heating mechanisms for vehicles and it has for its object the provision of a new and improved form and arrangement of parts by which an improved heating effect shall be produced. It is one of the objects of my invention to provide a heating mechanism of minimum size and weight in proportion to the heating effect such as to make it available conveniently for use in connection with automobiles and the like. It is another object of my invention to provide a mechanism of this type which shall be capable of effective use in connection with the usual generator and storage battery of the automobile, and which shall be so arranged as to have no detrimental effect on the operation of the generator and battery in connection with the usual electrical equipment of the car. It is one of the objects of my invention to provide an improved arrangement of control means by which my heating mechanism may be thrown into and out of effective operation as may be desired.

For accomplishing these ends, it has been my object to provide a novel arrangement of co-operating parts comprising an improved form of alternator the field of which is energized by a small direct current, as from the usual charging generator of an automobile or from the usual storage battery of the car, and which is so designed that when the speed of rotation of the alternator exceeds a certain predetermined minimum at which the output of the alternator is to be normal the output at such increased speed operation is kept from increasing to a dangerous limit.

For carrying out my purpose of providing heat for an automobile or other vehicle, it has been one of my objects to provide an improved system comprising a small polyphase alternator having its field energized from the usual charging generator, either directly from the generator or from the usual storage battery charged thereby, having its rotor element driven by power from the driving motor for the vehicle or from some part actuated by the forward movement of the vehicle, and arranged so that the increased reactance in the alternator when driven at high speed keeps down the output of the alternator at such high speed operation to safe limits.

It is another object of my invention to provide improved means for handling the heat from the resistance heater elements for conveying the heat to the desired point for use, comprising preferably a fan driven by a motor actuated by a very small portion of the output of said alternator.

It is another object of my invention to improve mechanisms of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings—

Fig. 1 is a diagrammatic view of the preferred embodiment of my invention as applied to an automobile;

Fig. 2 is a view also more or less diagrammatic showing the means for driving the alternator;

Fig. 3 is a diagrammatic view showing the arrangement of the fan and motor of my improved arrangement;

Fig. 4 is a view similar to Fig. 1 but showing a modified form of feed to the field coil of the alternator;

Fig. 5 is an enlarged detail showing of the form of thermostatic switch used in the mechanism of Fig. 4;

Fig. 6 is a top plan view of my improved heater unit mounted in position in a car;

Fig. 7 is a rear face view of my improved heater unit;

Fig. 8 is a front face view of said heater unit;

Fig. 9 is a face view of one of the heater elements of my improved unit, being substantially a sectional view on line 9—9 of Fig. 6;

Fig. 10 is a view of fragmentary portions of the oppositely positioned heater elements;

Fig. 11 is an enlarged detail view, partly in section, taken on the line 11—11 of Fig. 6; and Fig. 12 is a sectional view taken at line 12—12 of Fig. 6, and showing the front face of the fan.

While my invention is provided primarily for use in connection with automobiles, or trucks, or buses, or other motor vehicles, such as airplanes, for example, it is to be understood that my invention is capable of use to advantage in connection with vehicles which are propelled by a draw bar or the like, such as railway cars, for example. In the use of my invention in connection with motor vehicles, I prefer to have the driven parts actuated by power from the motor, while in a vehicle of a trailer type the driven parts would preferably be actuated by power from one or more of the supporting wheels.

In the arrangement shown in Fig. 1, 10 indicates the ordinary charging generator of an automobile adapted to produce direct current for charging the usual storage battery 11. In the arrangement shown, the field coil or coils of a polyphase alternator mounted preferably underneath the hood of the car are represented by the numeral 12, such coil or coils being connected by a lead 13 between the generator 10 and the batttery 11, such lead 13 having a rheostat 14 and an ammeter 15 connected in series therein between the coil 12 and the battery 11. A lead 16 is also provided between the battery and the generator in parallel with the rheostat 14 and the field coil 12. The charging generator 10 is grounded to the frame of the car at 17 and the storage battery is grounded to the frame of the car at 18. The arrangement is such that when the arm 14a of the rheostat is standing in the position as shown in Fig. 1 substantially the entire output from the generator 10 passes through the field coil means 12. When the arm 14a is given an intermediate position along the resistance of the rheostat, the current from the generator 10 is divided between the lead 13 through the field coil means 12 and the lead 16 in shunt relation to said field coil means. When the arm 14a is swung to the limit of its motion in clockwise direction in said Fig. 1, the field coil means 12 is effectively shunted out of connection with the generator. In this way, the strength of the current passing through the field coil means is very readily controlled.

The armature coils 19 of the alternator 20 comprise a distinct departure from the usual construction of corresponding parts in arrangements heretofore employed. In ordinary practice, an alternating current generator is driven at approximately a normal predetermined speed, and the generator is designed with reference to operation at approximately such predetermined normal speed. My alternator 20, however, is to be driven at a speed proportional to the forward movement of the vehicle upon which the alternator is mounted. In view of this condition, I have departed from the ordinary practice so as to provide that when the speed of rotation of the alternator exceeds a certain predetermined value the reactance of the alternator upon such increased speed rotation of the alternator absorbs the potential sufficiently for preventing the output of the alternator from increasing to any substantial extent. The number of the turns in the coils 19 and other elements of the design of the alternator are kept such that upon very high speed rotation of the alternator the output of the generator is kept substantially constant rather than being greatly increased as would be the result if the alternator were of the usual design.

For utilizing the output of the alternator 20 for producing heat, I have provided a heating unit comprising resistance heater elements 21, 22 and 23 which in the construction shown are star connected. The resistance heater element 21, 22 and 23 in the construction shown in Fig. 3 are located within a housing 24 in which there is located a fan or blower 25 of any approved type by the rotation of which a stream of air is forced past the heater elements for delivery to the body of the car as indicated by the arrow in Fig. 3.

For driving the fan or blower 25, I have provided an induction motor 26. With this arrangement, the speed at which the fan is driven is proportional to the effective output of the alternator, serving when the output increases to increase the delivery of air past the heating elements in the same proportion, whereby the heating elements are kept at substantially even temperature without danger of being burned out.

In Fig. 2, I have shown the means for driving the alternator 20 comprising a driving pulley 27 mounted upon the rotor shaft 28 of the alternator and engaging the usual fan belt 29 of the automobile driven by the timing shaft 30 or other moving part of the automobile.

By the use of my improved apparatus, the ordinary generator 10 of an automobile delivers current to the field coil 12 of the alternator 20 which is actuated by connection with any suitable driven part of the car. I have found in practice that the mechanical energy required for driving the alternator 20 is very small, and that the electrical energy consumed in the field coil 12 is so small as to have no material effect upon the battery 11 which operates in its usual manner and at its usual efficiency without any substantial added likelihood of becoming unduly discharged in the normal operation of the car. I have found in practice that under such conditions of use sufficient heat is delivered from the housing 24 for maintaining the desired temperature in a closed automobile even on a cold and windy day. When the speed of movement of the automobile is increased beyond a predetermined normal, the reactance in the alternator, increasing rapidly as the frequency is increased, absorbs a part of the potential which increases more slowly, serving thus to keep down the output from the alternator. If, however, there is a slight increase in the output from the alternator, such increase is immediately responsive for driving the single-phase induction motor 26 at increased speed, serving to deliver a greater quantity of air through the heater unit and serving thus to keep down the temperature of the resistance wire of the heating element.

In the arrangement shown in Figs. 4 and 5, the current for the field coil 12 of the alternator is taken directly from the battery 11 rather than from the generator 10. In this arrangement, the generator 10 and ammeter 15 are connected directly with the battery 11 by interrupted leads 30 in the usual well understood manner. The field coil 12 is then connected directly with the battery by leads 31 and 32, one of such leads having a thermostatically operated switch 33 of any approved type connected therein for controlling the feed of current to the field coil. In the arrangement shown, the switch 33 comprises a heat-affected element 34 of any approved type mounted in a housing member 35 in such relation that the lead 32 is completed through the switch device when the temperature of the element 34 reaches a predetermined minimum. By this arrangement, the alternator 20 is operated at full field strength during intermittent periods rather than at partial field strength at longer periods.

In the preferred arrangement, the heating elements of resistance wire, the fan, and the motor for driving the fan are arranged in unit formation as shown in Figs. 6 to 12. In the preferred arrangement, my improved unit which is indicated by the numeral 36 comprises a casing 37 provided with trunnions 38 extending from opposite sides pivotally mounted in the arms of a yoke 39 which in turn is pivotally mounted by means of a bolt 40 upon the dash or instrument board 41 of an automobile, the trunnions 38 being in alignment with each other at right angles with respect to the bolt 40. By this arrangement, comprising in effect a universal connection between the unit and the board 41, the unit 36 can be turned to point in any desired direction for delivering the heated air to any part of the car body as may be desired.

In the arrangement shown, the motor 26 by which the fan 25 is driven is mounted within a reduced portion 42 at the rear face of the housing 37, the forward end of the motor shaft 43 having the fan 25 mounted directly thereon, as is best shown in Fig. 12. For permitting the free entrance of air at the rear, the rear face of the housing 37 is provided with a series of openings 44. The reduced portion 42 of the housing in which the motor 26 is mounted is likewise provided with openings 45 in its rear face by which air is permitted to enter through the structure of the motor for the desired cooling effect therein. For permitting the escape of air at the forward end of the heater unit, the front face of the device is in the form of a screen or grating 46, as is shown in Fig. 8.

In my improved arrangement, each of the resistance wire elements 21, 22 and 23 is mounted separately in a ring 47 of fiber or other insulating material, the resistance wire in each instance being strung back and forth across the ring. As is best shown in Fig. 11, the three rings 47 supporting the three sets of resistance wiring are mounted in spaced relation to each other upon bolts 48, spacing blocks 49 of resistance material being interposed between the rings. Some of the bolts 48 are utilized for effecting the desired electrical connections between the heater elements and the leads connected with the alternator. In the preferred arrangement, the rings 47 are arranged in such relation circumferentially with respect to each other as to assure that the turns of each of the heater elements shall stand in substantially angled arrangement with respect to the turns of each of the other elements, whereby the heater elements are given a maximum efficiency for heating the air forced through the casing past said elements. An additional ring 50 of fiber or other suitable insulating material is interposed between the rearmost heater element and the fan 25, as is clearly shown in Fig. 11.

By the use of my improved arrangement as shown in Fig. 1, heat is available immediately upon the start of the operation of the motor of the automobile without the necessity for any delay for the heating of the water in the radiator or for any other purpose. The mechanism is very readily controlled, is simple in operation, is easily installed, is not likely to get out of order, can be operated without any danger whatever, and is economical in operation.

While I prefer to employ the form of mechanism as shown in my drawings and as above described, it is to be understood that my invention is not limited to the arrangement and construction shown except so far as the claims may be so limited by the prior art.

I claim:—

1. An electrical heating mechanism for vehicles, comprising in combination a housing, a heater element therein, means carried by the housing for forcing a stream of air through the housing past the heater element, a yoke pivotally connected with said housing, and means for pivotally mounting said yoke on the car body on an axis at an angle to the axis on which said yoke is connected with the housing.

2. An electrical heating mechanism for vehicles, comprising in combination a housing, a heater element therein, means carried by the housing for forcing a stream of air through the housing past the heater element, a yoke pivotally mounted on a horizontal axis on the car body, and means for pivotally mounting said housing between the arms of said yoke on an axis at substantially right angles to the axis on which said yoke is mounted on the car body.

JOSEPH G. SOLA.